United States Patent
Urakawa (10) Patent No.: US 9,025,173 B2
(45) Date of Patent: May 5, 2015

(54) IMAGE DISPLAY APPARATUS FOR DISPLAY OF A PLURALITY OF IMAGES

(71) Applicant: Yutaka Urakawa, Nagoya (JP)

(72) Inventor: Yutaka Urakawa, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/969,691

(22) Filed: Aug. 19, 2013

(65) Prior Publication Data

US 2014/0071483 A1 Mar. 13, 2014

(30) Foreign Application Priority Data

Sep. 13, 2012 (JP) ................................. 2012-201567

(51) Int. Cl.
- *G06F 3/12* (2006.01)
- *H04N 1/00* (2006.01)
- *G06F 3/0485* (2013.01)
- *G06F 3/0488* (2013.01)

(52) U.S. Cl.
CPC ......... *H04N 1/00408* (2013.01); *H04N 1/0035* (2013.01); *H04N 2201/33321* (2013.01); *G06F 3/0485* (2013.01); *G06F 3/0488* (2013.01); *H04N 1/00453* (2013.01); *H04N 1/00466* (2013.01)

(58) Field of Classification Search
None
See application file for complete search history.

(56) References Cited

U.S. PATENT DOCUMENTS

| | | | | |
|---|---|---|---|---|
| 6,421,071 | B1 * | 7/2002 | Harrison | 715/787 |
| 6,549,302 | B1 * | 4/2003 | Takeda et al. | 358/1.9 |
| 8,422,038 | B2 * | 4/2013 | Mori | 358/1.13 |
| 2003/0011802 | A1 | 1/2003 | Nakagiri et al. | |
| 2004/0264775 | A1 * | 12/2004 | Slobodin | 382/174 |
| 2012/0206498 | A1 * | 8/2012 | Kai et al. | 345/684 |
| 2013/0176298 | A1 * | 7/2013 | Lee et al. | 345/419 |

FOREIGN PATENT DOCUMENTS

JP 2003-094757 A 4/2003

\* cited by examiner

*Primary Examiner* — Miya J Cato (74) *Attorney, Agent, or Firm* — Scully, Scott, Murphy & Presser, P.C.

(57) ABSTRACT

An image display apparatus includes: a display device configured to display a plurality of images. At least one common setting is provided in common for the images, and an individual setting is allowed to be set individually for each image. A controller controls the display device to display the at least one common setting when the images displayed on the display device are being scrolled. When the images displayed on the display device are not being scrolled, the controller controls the display device to display at least one individual setting and at least one image of the images such that each of the at least one individual setting is displayed in association with a corresponding one of the at least one image.

16 Claims, 10 Drawing Sheets

IMAGE DISPLAY APPARATUS FOR DISPLAY OF A PLURALITY OF IMAGES

CROSS REFERENCE TO RELATED APPLICATION

The present application claims priority from Japanese Patent Application No. 2012-201567, which was filed on Sep. 13, 2012, the disclosure of which is herein incorporated by reference in its entirety.

BACKGROUND OF THE INVENTION

1. Field of the Invention

The present invention relates to an image display apparatus configured to display images based on image data and a non-transitory storage medium configured to store computer-readable instructions executable by the image display apparatus.

2. Description of the Related Art

There is known an image display apparatus configured to display a plurality of images on a display screen, allowing a user to select one or ones of the plurality of images for processings such as printing. In such an apparatus, setting items are provided for printing, and the user can set a plurality of values (i.e., set values) for the setting items. In some apparatuses, a plurality of images to be printed and a plurality of common set values that are set in common for the plurality of images are displayed for the user.

SUMMARY OF THE INVENTION

Also, in some apparatuses, common set values set in common for a plurality of images can be displayed, and a plurality of individual set values different from the common set values can be set for each of the plurality of images. In such apparatuses, when one of the plurality of images is selected, individual set values set for the selected image are displayed. In a case where a user checks both of (i) the common set values set in common for the plurality of images and (ii) the individual set values set individually for the images displayed, the user has to go through a complicated procedure of selecting the images one by one to display the individual set values for each image.

This invention has been developed to provide (i) an image display apparatus allowing a user to easily check individual set values and common set values and (ii) a non-transitory storage medium configured to store computer-readable instructions executable by the image display apparatus.

The present invention provides an image display apparatus, including: a storage configured to store a plurality of sets of image data; a display device configured to display a plurality of images based on the plurality of sets of image data stored in the storage, wherein at least one common setting is provided in common for the plurality of images, and an individual setting is allowed to be set individually for each of the plurality of images; and a controller configured to control the display device, the controller being configured to control the display device to display the at least one common setting when the plurality of images displayed on the display device are being scrolled, the controller being configured to, when the plurality of images displayed on the display device are not being scrolled, control the display device to display at least one individual setting and at least one image of the plurality of images such that each of the at least one individual setting is displayed in association with a corresponding one of the at least one image.

The present invention also provides a non-transitory storage medium configured to store computer-readable instructions executable by a computer of an image display apparatus, the image display apparatus including: a storage configured to store a plurality of sets of image data; and a display device configured to display a plurality of images based on the plurality of sets of image data stored in the storage, wherein at least one common setting is provided in common for the plurality of images, and an individual setting is allowed to be set individually for each of the plurality of images, the computer-readable instructions including: controlling the display device to display the at least one common setting when the plurality of images displayed on the display device are being scrolled; and when the plurality of images displayed on the display device are not being scrolled, controlling the display device to display at least one individual setting and at least one image of the plurality of images such that each of the at least one individual setting is displayed in association with a corresponding one of the at least one image.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

<Structure of MFP>

Figure 1:
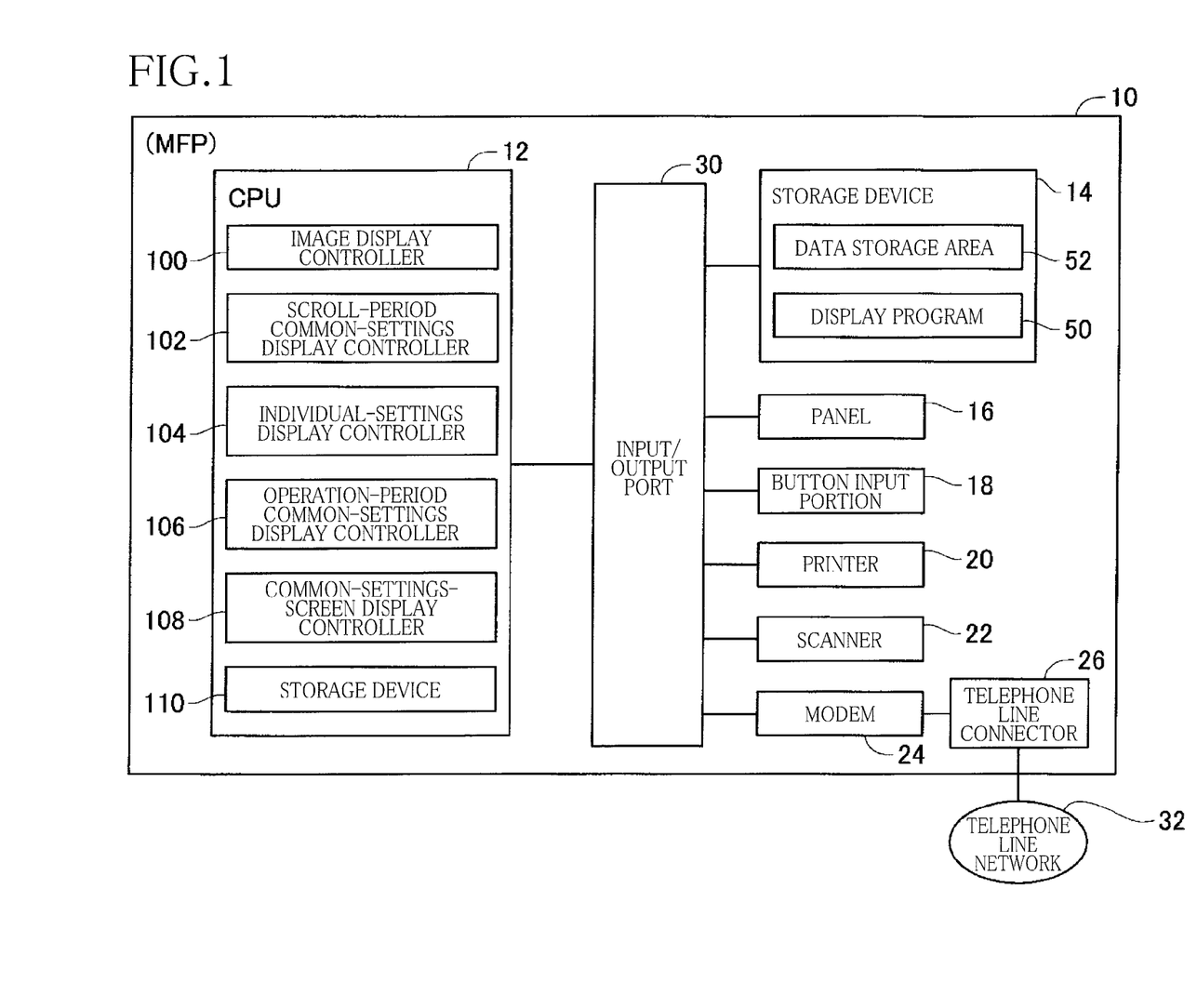
FIG. 1 is a block diagram illustrating a structure of a multi-function peripheral (MFP) 10.

Hereinafter, there will be described one embodiment of the present invention by reference to the drawings. FIG. 1 illustrates a multi-function peripheral or MFP 10 as one example of an image display apparatus according to one embodiment of the present invention. The MFP 10 includes a central processing unit or CPU 12 as one example of a controller, a storage device 14 as one example of a storage, a panel 16 as one example of a display device, a button input portion 18, a printer 20, a scanner 22, a modem 24, and a telephone line connector 26. These components are communicably coupled to each other via an input/output port 30.

The panel 16 has a display surface for displaying various functions of the MFP 10. The button input portion 18 includes a touch sensor and is constructed integrally with the panel 16.

When an input object such as a user's finger and a stylus has touched or approached the panel 16, the button input portion 18 detects the touch or approach and receives a button operation of the user. Also, when the input object is moved rightward or leftward in a state in which the input object is on or near the panel 16, the button input portion 18 detects a direction of the slide of the input object and receives a flick operation or a dragging operation of the user.

The printer 20 is designed to perform printing. The scanner 22 is designed to scan a document to create scan data. The modem 24 is designed to convert document data into a signal transmittable to a telephone line network 32 and transmit the signal to the telephone line network 32 via the telephone line connector 26 using a facsimile function. The modem 24 is also designed to receive a signal from the telephone line network 32 via the telephone line connector 26 to decode the signal into document data.

The CPU 12 executes processings according to a display program 50 stored in the storage device 14. The display program 50 is a program for displaying images on the panel 16. It is noted that the storage device 14 is constituted by various components including a random access memory or RAM, a read only memory or ROM, a flash memory, a hard disc, and a buffer of the CPU 12.

The storage device 14 includes a data storage area 52 as one example of an information storage. The data storage area 52 is an area for storing various data such as image data for displaying an image on the panel 16, and data required for the CPU 12 to execute the display program 50. It is noted that image data can be obtained from a device such as a personal computer and a memory card and stored into the data storage area 52. Specifically, the MFP 10 includes a network interface, not shown, via which the MFP 10 can receive image data from, e.g., a personal computer communicably coupled to the MFP 10 to store the image data into the data storage area 52. The MFP 10 further includes a memory card interface, not shown, and the MFP 10 can obtain image data from a memory card connected to the memory card interface, to store the image data into the data storage area 52.

<Display of Images on Panel>

Figure 2A:
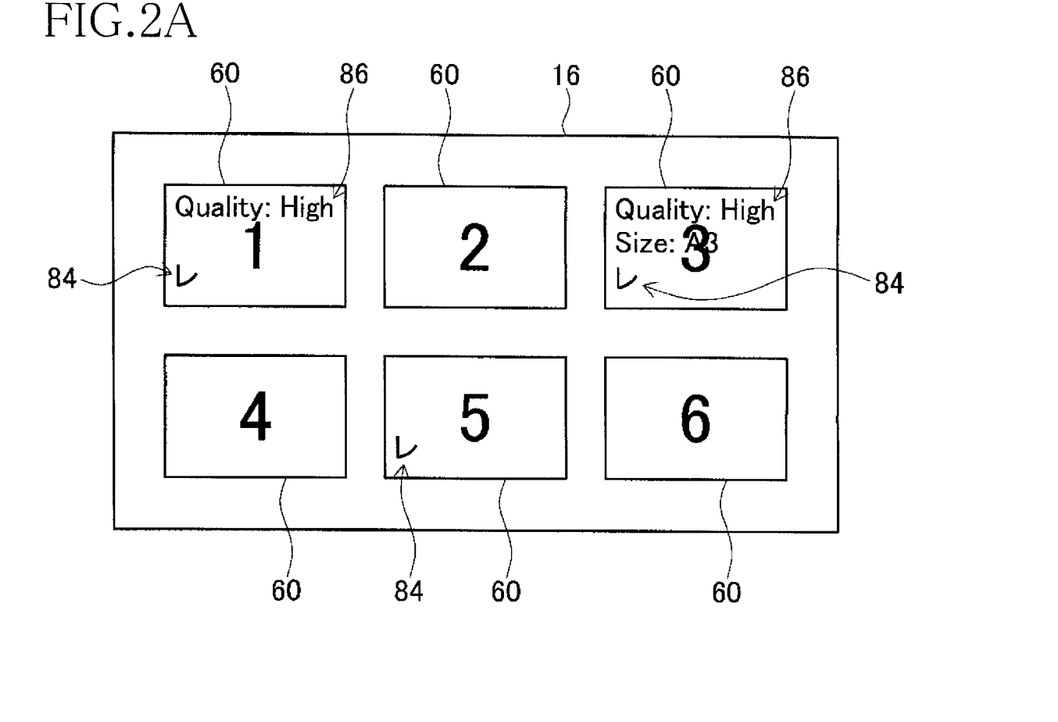
FIGS. 2A and 2B are views illustrating images displayed on a panel 16 when images 60 are not scrolling and are scrolling, respectively.

When the user prints images, e.g., photographs, on the printer 20, as illustrated in FIG. 2A, a plurality of images 60 are displayed on the panel 16 based on a plurality of sets of image data, respectively. In the display in FIG. 2A, six images "1" through "6" are displayed each as the image 60. The user can select an image or images 60 to be printed by touch or approach of the input object. A plurality of set values are assigned respectively to a plurality of predetermined setting items, and the printer 20 prints an image 60 based on the set values assigned thereto. Examples of the setting items include an image quality, a size of a recording medium in the form of a sheet, and an enlargement/reduction ratio. A predefined value as a default setting is set in advance for each setting item of each image, and such a value will be referred to as "common setting" in the following explanation. On the other hand, the user can set a set value individually for each setting item of each image, and such a set value will be referred to as "individual setting" in the following explanation. Specifically, as will be described below, the MFP 10 as the present embodiment can individually change a set value from the common setting for each setting item of each image, and the MFP 10 can individually set a value without any change from the common setting for each setting item of each image. Accordingly, the common setting is used only for a set item for which the individual setting is not set.

The user sets the set values individually in the following manner. For example, when the user sets or changes a set value of the image 60, the user moves the input object such that the input object touches or approaches the image 60, so that an individual-settings change screen 70 illustrated in FIG. 3 appears on the panel 16. Images displayed on the individual-settings change screen 70 include the selected image 60, a Back button 72, a Settings button 74, an OK button 76, a Plus button 78, a Minus button 80, and a number-of-prints display area 82.

Figure 3:
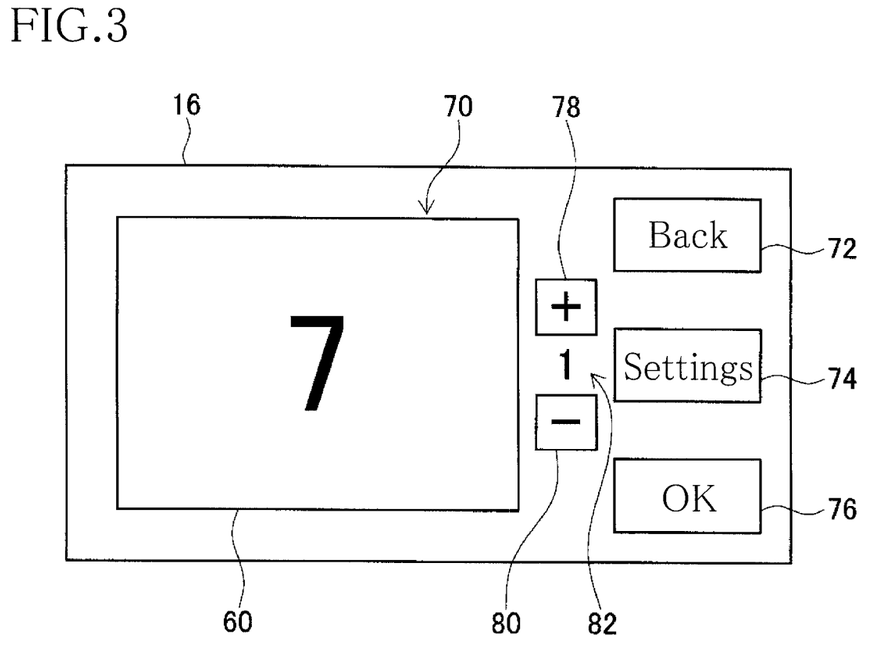
FIG. 3 is a view illustrating an individual-settings change screen 70 displayed on the panel 16.

The Back button 72 is used to switch a screen displayed on the panel 16 back to the screen containing the plurality of images 60 (see FIG. 2A) without changing the set values of the selected image 60. The Settings button 74 is used to change the set value or values of the selected image 60. When the Settings button 74 is pressed, a screen, not shown, for performing a detailed setting of the set values is displayed on the panel 16. The Plus button 78 and the Minus button 80 are used to respectively increase and reduce the number of prints of the selected image 60. The number-of-prints display area 82 is a display area on which the number of prints of the selected image 60 is displayed. That is, the operation of the Plus button 78 or the Minus button 80 increases or reduces the number displayed on the number-of-prints display area 82. The OK button 76 is used to confirm the change of the set values of the selected image 60 and determine the selected image 60 as the image 60 to be printed. It is noted that when the OK button 76 is pressed, the screen displayed on the panel 16 is switched back to the screen containing the plurality of images 60 (see FIG. 2A), and a check mark 84 is displayed on the image 60 to be printed.

As illustrated in FIG. 2A, the set value or values are displayed as the individual setting(s) for each of the images 60 for which the above-described operations are performed. Specifically, the individual setting or settings are displayed on an individual-setting display area 86 of each of the images 60 for which the individual setting or settings are set. On the individual-setting display area 86, the CPU 12 displays only the individual settings that are different from the set value predefined for each of the plurality of setting item, i.e., the set value as the common setting set for all the images. The setting item is also displayed on the individual-setting display area 86 along with the set value. Since only the individual settings are displayed, a small display area is enough to display the set value(s) on the individual-setting display area 86, resulting in reduced overlap of the individual settings on the image 60. It is noted that the set values displayed on the individual-setting display area 86 of each image 60 are displayed in white.

Specifically, there will be explained a case where the common settings are set in the following manner: a set value "Normal" is set for the image quality as the setting item, a set value "A4" for the size of the recording medium, and a set value "100%" for the enlarge/reduction ratio. In a case where a set value "High" as an individual setting is set for the image quality of the image "1" displayed on the panel 16, only the set value for the image quality differs from the common settings, so that only the set value for the image quality is displayed on the individual-setting display area 86 of the image "1". In a case where the set value "High" and a set value "A3" as individual settings are set respectively for the image quality and the size of the recording medium for the image "3" displayed on the panel 16, the set values for the image quality and the size differ from the common settings, so that the set values for the image quality and the size are displayed on the individual-setting display area 86 of the image "3". It is noted that the set value for the image quality of the image "5" displayed on the panel 16 is set at "Normal" as the individual setting, and the image "5" is set as the image 60 to be printed, but the set value for the image quality is the same as the set value "Normal" as a common setting for the image quality. Accordingly, the set value "Normal" is not displayed on the individual-setting display area 86 of the image "5". In the present embodiment, as illustrated in FIG. 2A, among the images "1", "3", and "5" with the check marks 84 indicating the image to be printed, only set values different from the common settings are displayed on images (i.e., the images "1" and "3") for which the set values as the individual settings are different from the set values as the common settings. This display allows the user to easily recognize images not to be printed, when compared with a case where set values different from the set values as the common settings are displayed for all the images being displayed.

Figure 2B:
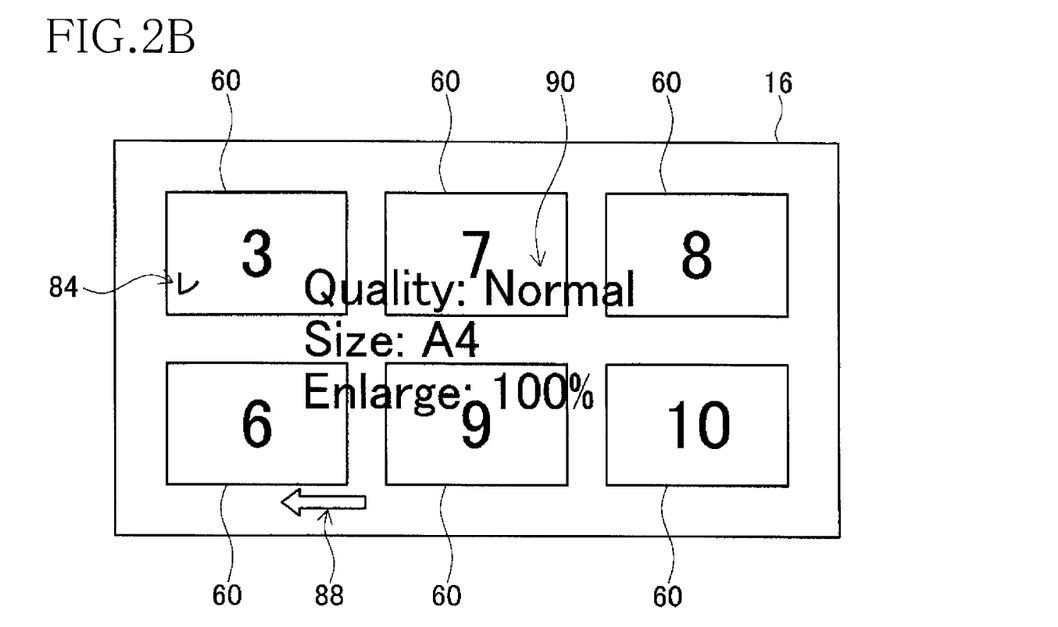

The images 60 displayed on the panel 16 can be scrolled rightward and leftward by the user performing the flick operation on the panel 16 in a right and left direction. Specifically, for example, when a leftward flick operation is performed by the user, the images 60 can be scrolled as illustrated in FIG. 2B. It is noted that arrow 88 illustrated in FIG. 2B represents a direction of the flick operation and a scroll direction of the images 60.

This flick operation replaces some or all of the images 60 displayed on the panel 16 with different images (i.e., images "7"-"10" in FIG. 2B). During the scrolling of the images 60, the set values disappear from the individual-setting display areas 86 of the images 60, and the common settings appear on a common-settings display area 90 located on a central portion of the panel 16. Specifically, on the common-settings display area 90 is displayed information indicating that the set value for the image quality is "Normal", the set value for the size of the recording medium is "A4", and the set value for the enlarge/reduction ratio is "100%". It is noted that the set values displayed on the common-settings display area 90 are displayed in white.

That is, when the images 60 are being scrolled by the flick operation, the common settings are displayed on the common-settings display area 90, and when the images 60 are not being scrolled, the individual setting or settings are displayed on the individual-setting display area 86 of each of some or all of the images 60. Thus, the user can switch the display on the panel 16 between the common settings and the individual settings only by performing or not performing the scroll operation, allowing the user to easily recognize the settings of the printing for each image.

It is noted that this MFP 10 can be set in the following manner: the common settings are displayed on the common-settings display area 90 only when the images 60 are scrolling in a predefined direction, specifically, when the images 60 are scrolling in the right direction when viewed from the user, and the common settings are not displayed on the common-settings display area 90 when the images 60 are scrolling in a direction opposite the predefined direction, i.e., in the left direction when viewed from the user. When the images 60 are scrolling in the right direction, images 60 that had been displayed before reappear on the panel 16 in most cases. When the images 60 are scrolling in the left direction, on the other hand, images 60 having not been displayed yet appear on the panel 16 in most cases. That is, when the images 60 having not been displayed yet are displayed on the panel 16, the common settings are not displayed on the common-settings display area 90, and when the images 60 that had been displayed before are displayed on the panel 16, the common settings are displayed on the common-settings display area 90. These operations allow the user to view the images 60 having not been displayed yet, without the common settings overlapping the images 60.

Also, the CPU 12 can display the common settings on the common-settings display area 90 not depending upon the scroll direction of the image 60 but depending upon whether the images 60 have not been displayed yet or had been displayed before. Specifically, information for identifying the images 60 that had been displayed on the panel 16 is stored into the data storage area 52. Only when the images 60 identified based on the information stored appear on the panel 16 by scrolling, the common settings are displayed on the common-settings display area 90 during the scrolling. On the other hand, when images 60 not identified based on the information stored appear on the panel 16 by scrolling, the common settings are not displayed on the common-settings display area 90 during the scrolling. These operations can reliably inhibit the common settings from being displayed when the images 60 having not been displayed yet are displayed on the panel 16.

In the present embodiment, the user can select one of the setting of displaying the common settings on the common-settings display area 90 during rightward scrolling, the setting of displaying the common settings on the common-settings display area 90 in the case where the images 60 had been displayed before, and a setting of always displaying the common settings on the common-settings display area 90 during scrolling in any direction.

Also, when the input object touches or approaches the common-settings display area 90 of the panel 16, the panel 16 displays a common-settings change screen, not shown, for changing the common settings. The user can operate the common-settings change screen to change the common settings. That is, the common-settings display area 90 serves as a button for displaying the common-settings change screen. This configuration eliminates a need for the panel 16 to display the button for displaying the common-settings change screen, enabling effective use of the display region of the panel 16.

The common settings displayed on the common-settings display area 90 disappear when a predetermined length of time has passed from a stop of the scrolling of the images 60. This configuration allows the user to operate the common-settings display area 90 within the predetermined length of time from the completion of the flick operation, resulting in improved operability of the user.

When the common setting or settings are changed by the operation on the common-settings change screen, only the changed common setting or settings that are different from the previous common setting or settings are displayed on the individual-setting display area 86. Specifically, there will be next explained, by way of example, a case where the common setting for the image quality in FIG. 2B is changed from "Normal" to "High". As illustrated in FIG. 2A, the set value for the image quality of the image "1" displayed on the panel 16 is "High" that is the same as the set value for the image quality as the changed common setting. Thus, no individual settings are displayed on the individual-setting display area 86 of the image "1". That is, the CPU 12 dismisses or extinguishes the set value for the image quality displayed on the individual-setting display area 86 of the image "1" (see FIG. 2A).

Also, as illustrated in FIG. 2A, the set value for the image quality of the image "3" displayed on the panel 16 is "High" that is the same as the set value for the image quality as the changed common setting. Thus, the individual setting for the image quality is not displayed on the individual-setting display area 86 of the image "3". However, as illustrated in FIG. 2A, the set value for the size of the recording medium for the image "3" is "A3" that differs from the set value for the size of the recording medium as the changed common setting, and accordingly the set value for the size of the recording medium is displayed on the individual-setting display area 86 of the image "3". That is, the CPU 12 dismisses the set value for the image quality displayed on the individual-setting display area 86 of the image "3" (see FIG. 2A).

Also, the set value for the image quality of the image "5" displayed on the panel 16 is "Normal" as the individual setting. However, since the common setting is changed, the set value for the image quality of the image "5" is different from the set value for the image quality as the changed common setting. Thus, the set value for the image quality is displayed on the individual-setting display area 86 of the image "5". It is noted that the set value for the image quality of the image "5" is displayed in red.

As described above, only the individual setting or settings different from the changed common setting(s) are displayed on the individual-setting display area 86. Thus, a small display area is enough to display the individual setting(s) on the individual-setting display area 86, resulting in reduced overlap of the individual settings on the image 60. Also, the set value or values newly displayed on the individual-setting display area 86 owing to the change of the common setting are displayed in red. As a result, the user can reliably recognize the individual settings different from the common settings.

Also, even when the images 60 are not scrolled by the flick operation, the common settings are displayed on the common-settings display area 90. Specifically, in a case where the images 60 displayed on the panel 16 have been scrolled to an end of the scrolling, the images 60 are not scrolled even when the flick operation is performed. However, while the flick operation is being performed in this case, the common settings are displayed on the common-settings display area 90. This configuration allows the user to cause the common settings to be displayed on the common-settings display area 90 even in the case where the images 60 are located at the end of the scrolling. It is noted that the end of the scrolling is a position at which the images 60 on the panel 16 cannot be further moved rightward or leftward.

<Display Program>

The above-described images and the set values for the images to be printed are displayed by the CPU 12 according to the display program 50. For example, the CPU 12 starts displaying these images and set values on the panel 16 when a command for printing images is received from the user via the button input portion 18. There will be explained, with reference to FIGS. 4-10, flows for controlling the panel 16 to display the images 60 and the set values for the images to be printed.

Figure 4:
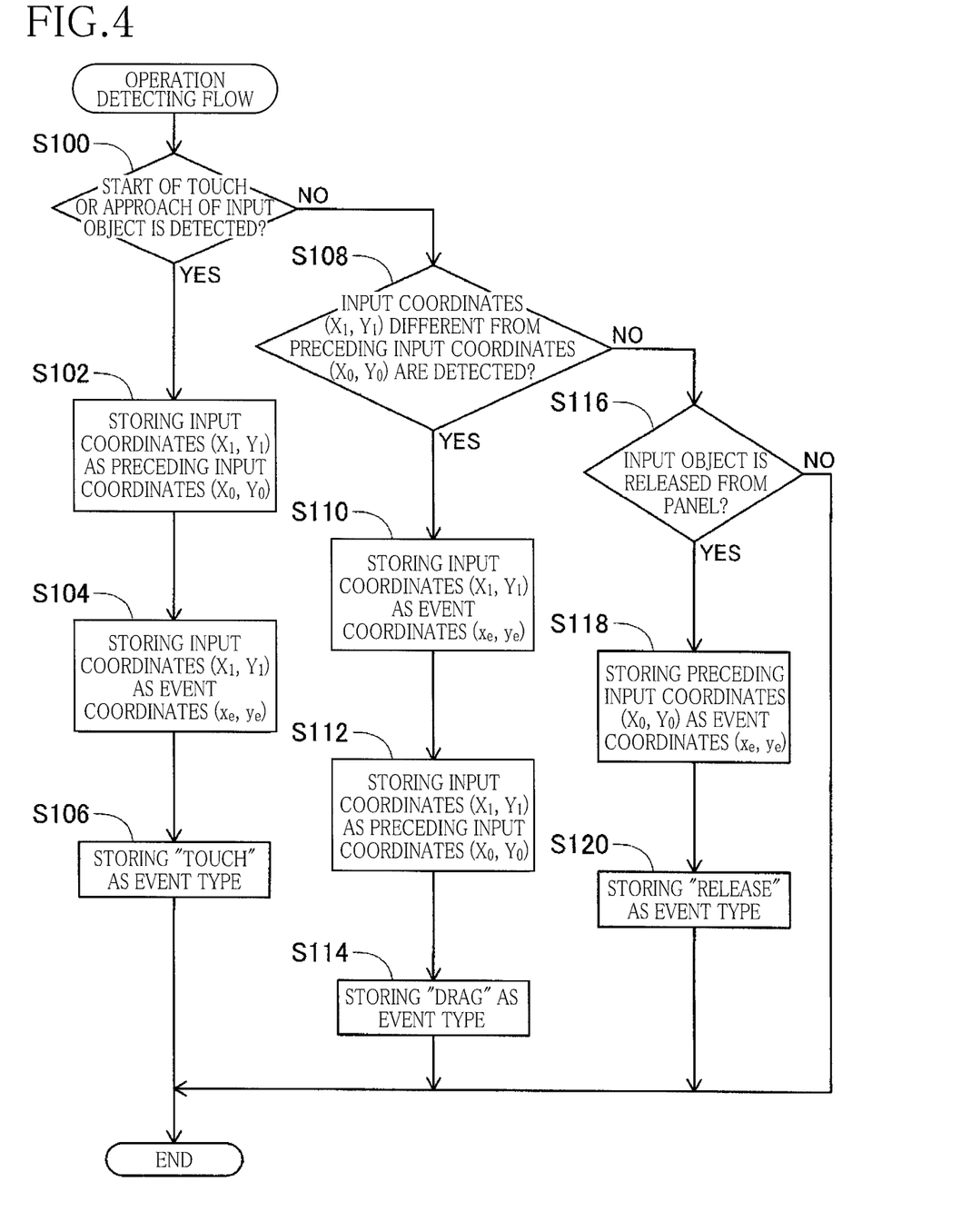
FIG. 4 is a flow chart illustrating processings executed in the MFP 10.

According to the display program 50, the CPU 12 executes an operation detecting flow for detecting an operation of the user for the panel 16. This operation detecting flow begins with S100 at which the CPU 12 determines whether or not the panel 16 has detected a start of touch or approach of the input object on or to the panel 16. When the start of touch or approach of the input object on or to the panel 16 is detected (S100: YES), the CPU 12 at S102 stores input coordinates $(X_1, Y_1)$ of this touch or approach as preceding input coordinates $(X_0, Y_0)$. The CPU 12 at S104 stores the input coordinates $(X_1, Y_1)$ as event coordinates $(x_e, y_e)$. The CPU 12 at S106 stores "TOUCH" as an event type, and this operation detecting flow ends. It is noted that when this operation detecting flow ends, the same flow restarts.

When the start of touch or approach of the input object on or to the panel 16 is not detected (S100: NO), the CPU 12 at S108 determines whether or not the panel 16 has detected input coordinates $(X_1, Y_1)$ that differs from the preceding input coordinates $(X_0, Y_0)$. That is, the determination at S108 is executed in the case where the positive decision is made at S100 (S100: YES), then the processings at S102-S106 are executed, and then the operation detecting flow is started again in a state in which the input object is kept located on or near the panel 16. When the input coordinates $(X_1, Y_1)$ different from the preceding input coordinates $(X_0, Y_0)$ are detected (S108: YES), the CPU 12 at S110 stores the input coordinates $(X_1, Y_1)$ as the event coordinates $(x_e, y_e)$. The CPU 12 at S112 stores the input coordinates $(X_1, Y_1)$ as the preceding input coordinates $(X_0, Y_0)$. The CPU 12 at S114 stores "DRAG" as the event type, and this operation detecting flow ends.

When the input coordinates $(X_1, Y_1)$ different from the preceding input coordinates $(X_0, Y_0)$ are not detected (S108: NO), the CPU 12 at S116 determines whether the input object has been released from the panel 16 or not. When the input object is released from the panel 16 (S116: YES), the CPU 12 at S118 stores the preceding input coordinates $(X_0, Y_0)$ as the event coordinates $(x_e, y_e)$. The CPU 12 at S120 stores "RELEASE" as the event type, and the operation detecting flow ends. It is noted that when the input object is not released from the panel 16 (S116: NO), the operation detecting flow ends.

Figure 5:
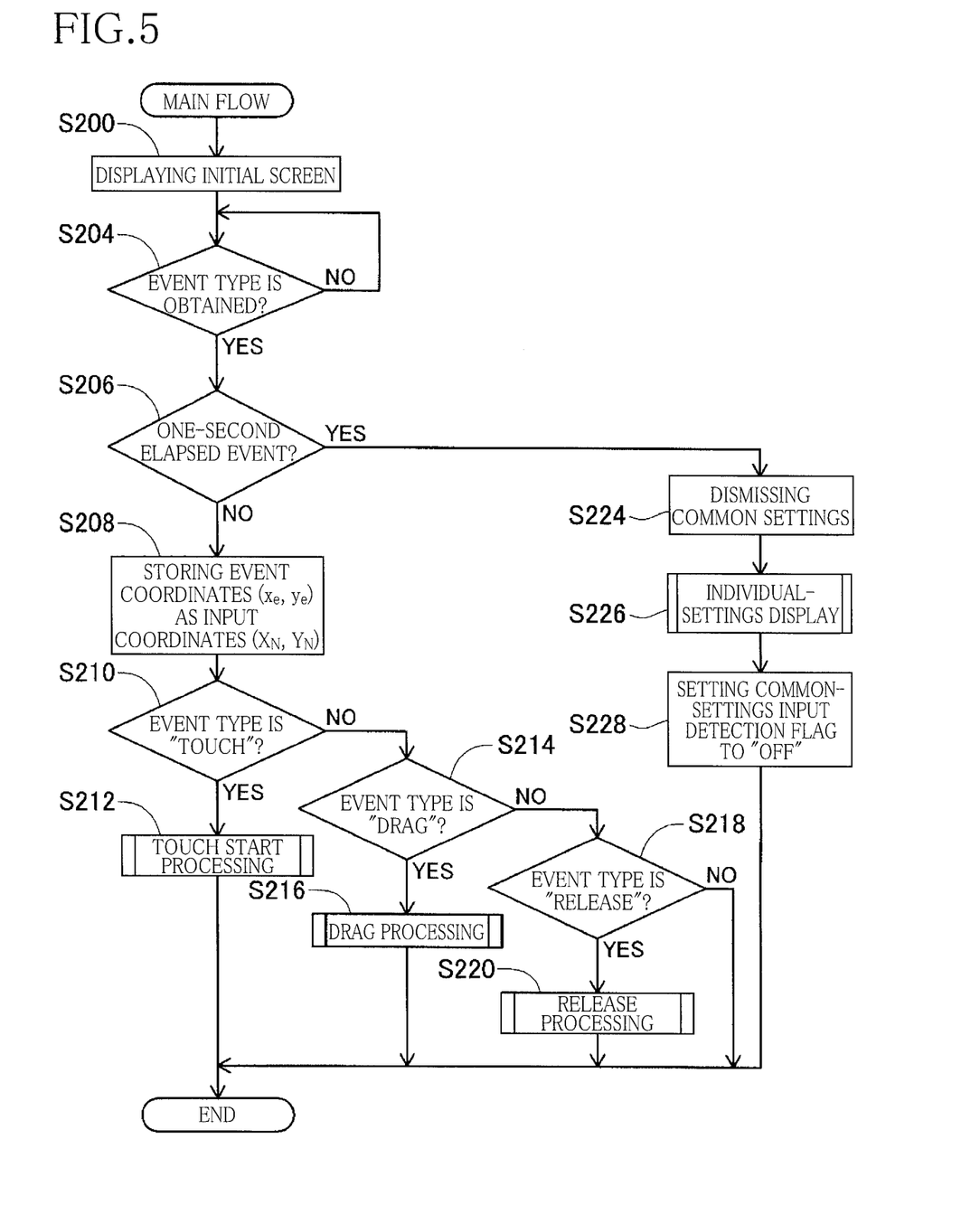
FIG. 5 is a flow chart illustrating processings executed in the MFP 10.

According to the display program 50, the CPU 12 also executes a main flow for controlling the panel 16 to display the images and the set values depending upon the event type. For example, the CPU 12 starts displaying these images and set values on the panel 16 when the command for printing images is received from the user via the button input portion 18. This main flow is executed in parallel with the operation detecting flow. This main flow begins with S200 at which the CPU 12 controls the panel 16 to display an initial screen, i.e., a screen corresponding to the screen illustrated in FIG. 2A. It is noted that the initial screen does not contain the check mark 84 and the individual settings.

The CPU 12 at S204 determines whether the event type is obtained in the operation detecting flow or not. When the event type is not obtained (S204: NO), this flow repeats the processing at S204. On the other hand, when the event type is obtained (S204: YES), the CPU 12 at S206 determines whether the event type obtained is "one-second elapsed event" or not. It is noted that "one-second elapsed event" will be explained later.

When the event type is not "one-second elapsed event" (S206: NO), the CPU 12 at S208 stores the event coordinates $(x_e, y_e)$ as input coordinates $(X_N, Y_N)$. The CPU 12 at S210 determines whether the event type is "TOUCH" or not. When the event type is "TOUCH" (S210: YES), the CPU 12 at S212 executes a touch start processing flow illustrated in FIG. 6.

Figure 6:
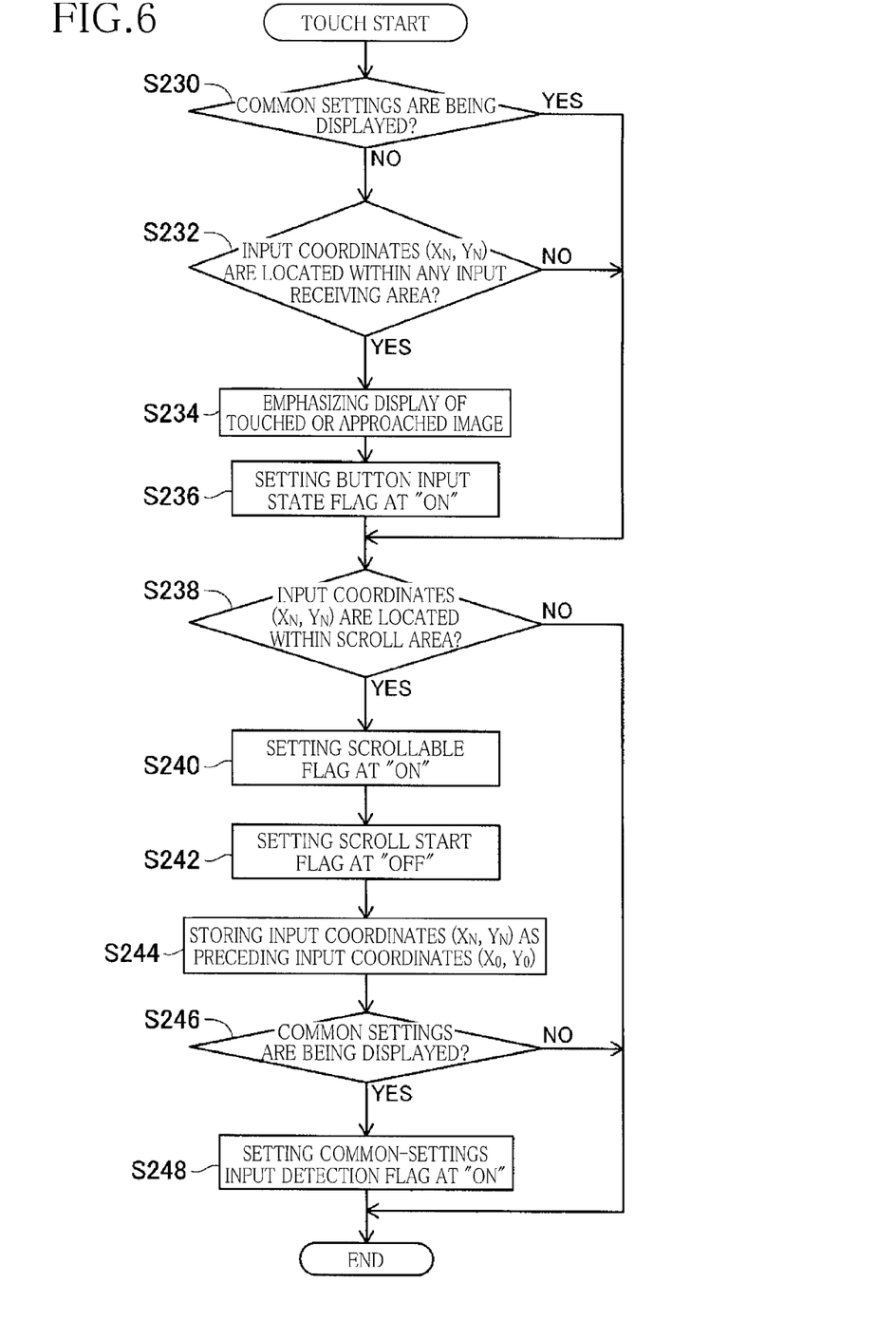
FIG. 6 is a flow chart illustrating processings executed in the MFP 10.

In the touch start processing flow, the CPU 12 at S230 determines whether the common settings are being displayed on the common-settings display area 90 of the panel 16 or not. When the common settings are being displayed (S230: YES), this flow goes to S238. On the other hand, when the common settings are not being displayed (S230: NO), the CPU 12 at S232 determines whether the input coordinates $(X_N, Y_N)$ are located within an input receiving area of any of the images or not, that is, the CPU 12 determines whether the input coordinates $(X_N, Y_N)$ are located on any of the images or not.

When the input coordinates $(X_N, Y_N)$ are not located within the input receiving area of any of the images (S232: NO), this flow goes to S238. On the other hand, when the input coordinates $(X_N, Y_N)$ are located within the input receiving area of any of the images (S232: YES), the CPU 12 at S234 emphasizes display of the touched or approached image displayed in an area containing the input coordinates $(X_N, Y_N)$. The CPU 12 at S236 sets a button input state flag at "ON". It is noted that the button input state flag indicates whether the input object is touching or approaching the image or not, and the "ON" state of the button input state flag indicates that the input object is touching or approaching the image.

The CPU 12 at S238 determines whether the input coordinates $(X_N, Y_N)$ are located within a scroll area or not. That is, the CPU 12 determines whether the input coordinates $(X_N, Y_N)$ are located within an area on which the scroll operation can be performed on the screen. When the input coordinates $(X_N, Y_N)$ are not located within the scroll area (S238: NO), the touch start processing flow ends. On the other hand, when the input coordinates $(X_N, Y_N)$ are located within the scroll area (S238: YES), the CPU 12 at S240 sets a scrollable flag at "ON". It is noted that the scrollable flag indicates whether the scroll operation is allowed or not, and the "ON" state of the scrollable flag indicates that the scroll operation is allowed. The CPU 12 at S242 sets a scroll start flag at "OFF". It is noted that the scroll start flag indicates whether scroll of the screen (i.e., the images) in response to the scroll operation is allowed or not, and when the "OFF" state of the scroll start flag indicates that the scroll of the screen is not allowed.

The CPU 12 at S244 stores the input coordinates $(X_N, Y_N)$ as the preceding input coordinates $(X_0, Y_0)$. The CPU 12 at S246 determines whether the common settings are being displayed on the common-settings display area 90 of the panel 16 or not. When the common settings are not being displayed (S246: NO), the touch start processing flow ends. On the other hand, when the common settings are being displayed (S246: YES), the CPU 12 at S248 sets a common-settings input detection flag at "ON". It is noted that the common-settings input detection flag indicates whether the common-settings display area 90 has been operated or not, and the "ON" state of the common-settings input detection flag indicates that the common-settings display area 90 has been operated. Upon completion of the processing at S248, the touch start processing flow ends. The CPU 12 then returns to the main flow, and the main flow ends.

When the event type is not "TOUCH" at S210 in the main flow (S210: NO), the CPU 12 at S214 determines whether the event type is "DRAG" or not. When the event type is "DRAG" (S214: YES), the CPU 12 at S216 executes a drag processing flow illustrated in FIG. 7.

Figure 7:
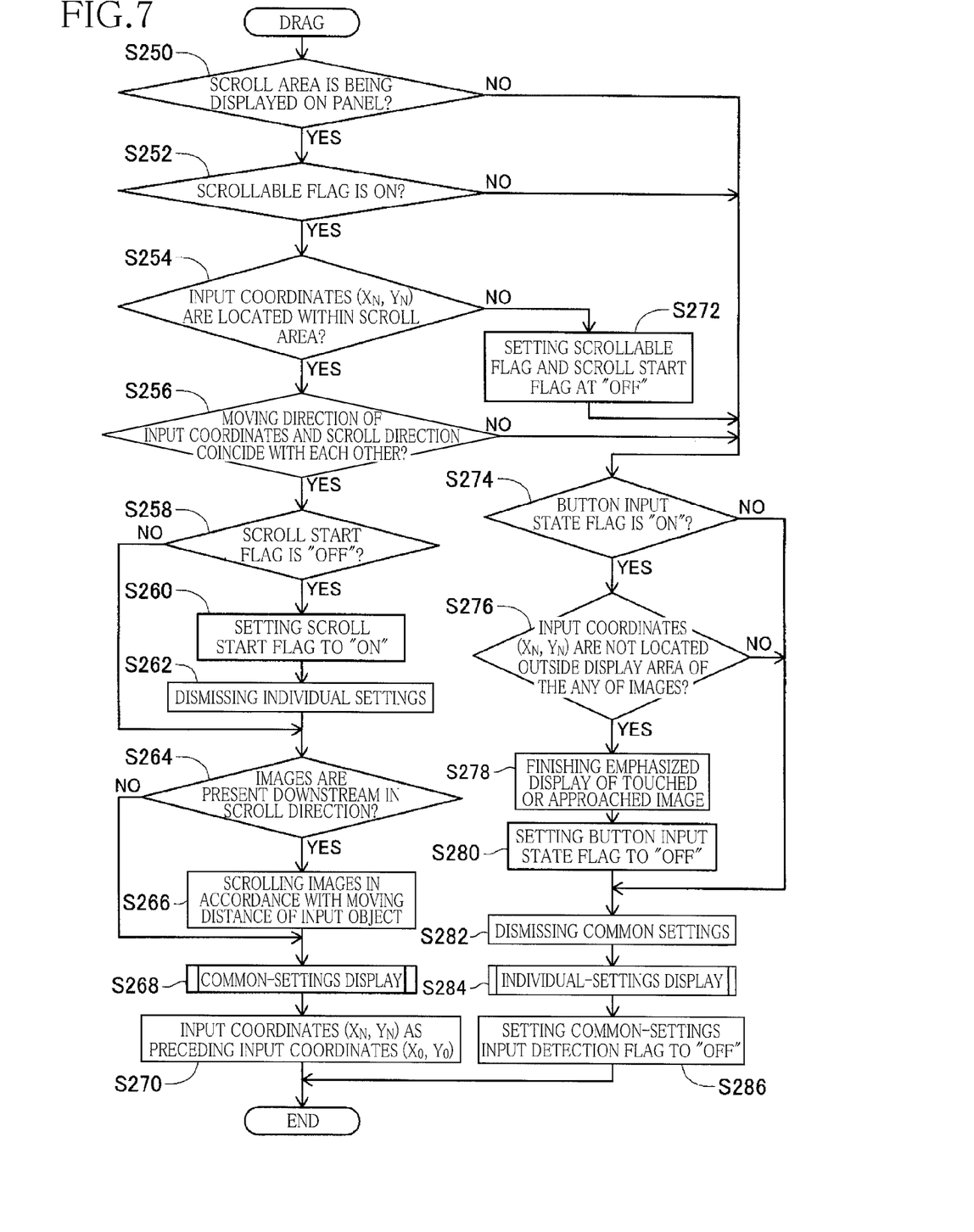
FIG. 7 is a flow chart illustrating processings executed in the MFP 10.

The drag processing flow begins with S250 at which the CPU 12 determines whether the scroll area is being displayed on the panel 16 or not. When the scroll area is not being displayed on the panel 16 (S250: NO), this flow goes to S274. On the other hand, when the scroll area is being displayed on the panel 16 (S250: YES), the CPU 12 at S252 determines whether the scrollable flag is "ON" or not. When the scrollable flag is not "ON" (S252: NO), this flow goes to S274. On the other hand, when the scrollable flag is "ON" (S252: YES), the CPU 12 at S254 determines whether the input coordinates $(X_N, Y_N)$ are located within the scroll area or not.

When the input coordinates $(X_N, Y_N)$ are not located within the scroll area (S254: NO), the CPU 12 at S272 sets the scrollable flag and the scroll start flag at "OFF", and this flow goes to S274. On the other hand, when the input coordinates $(X_N, Y_N)$ are located within the scroll area (S254: YES), the CPU 12 at S256 determines whether a direction of movement of the input coordinates and the scroll direction coincide with each other or not.

When the direction of movement of the input coordinates and the scroll direction do not coincide with each other (S256: NO), for example, when the scroll direction is the right and left direction, but the direction of movement of the input coordinates is the up and down direction, this flow goes to S274. On the other hand, when the direction of movement of the input coordinates and the scroll direction coincide with each other (S256: YES), the CPU 12 at S258 determines whether the scroll start flag is "OFF" or not. When the scroll start flag is not "OFF" (S258: NO), this flow goes to S264. On the other hand, when the scroll start flag is "OFF" (S258: YES), the CPU 12 at S260 sets the scroll start flag to "ON". The CPU 12 at S262 dismisses the individual settings displayed on the individual-setting display area 86 of the panel 16.

The CPU 12 at S264 determines whether images are present at a downstream position in the scroll direction or not. When no images are present downstream in the scroll direction (S264: NO), this flow goes to S268. On the other hand, when images are present downstream in the scroll direction (S264: YES), the CPU 12 at S266 controls the panel 16 to scroll images in accordance with a distance of movement of the input object, and the CPU 12 at S268 executes a common-settings display flow illustrated in FIG. 8.

Figure 8:
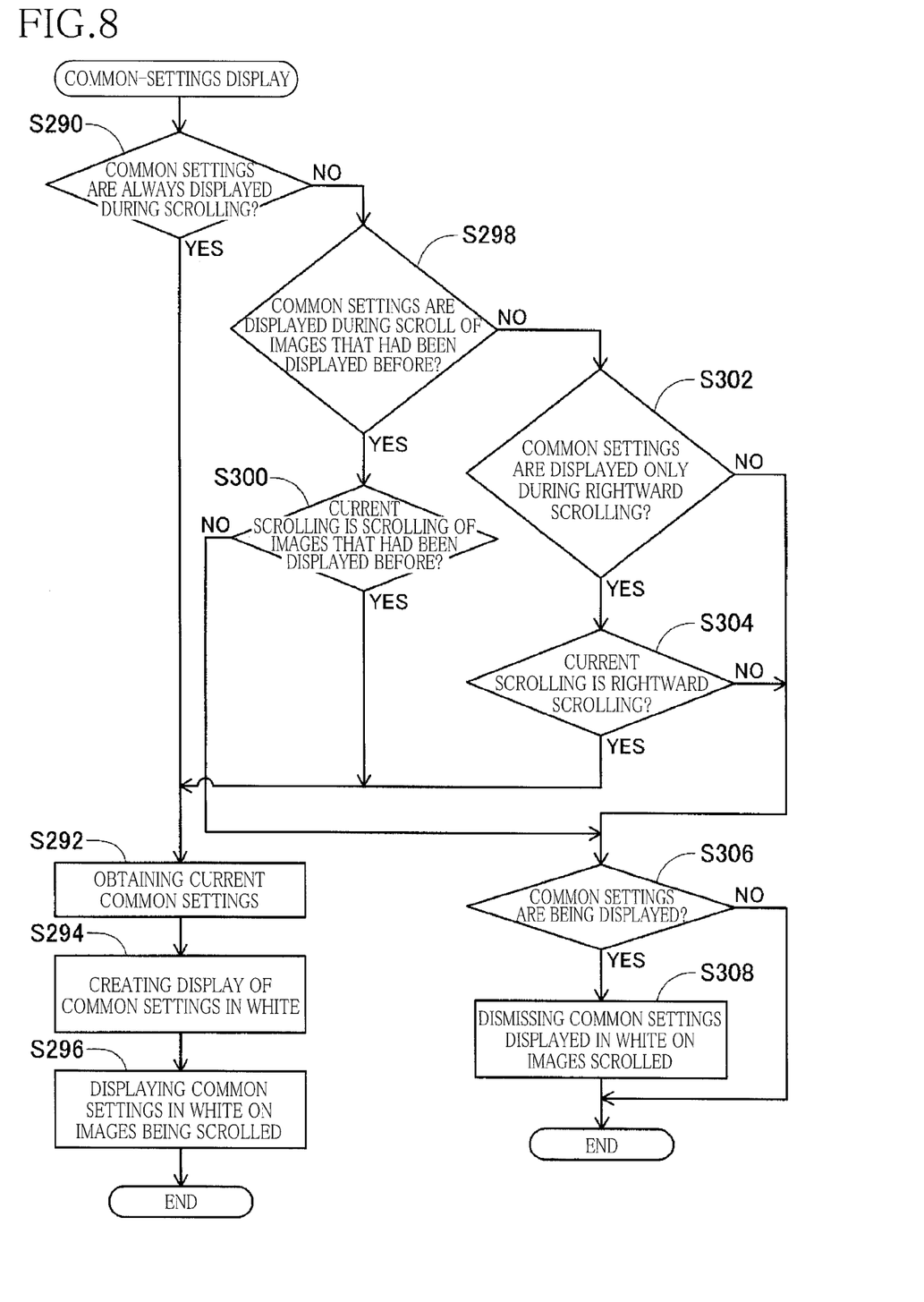
FIG. 8 is a flow chart illustrating processings executed in the MFP 10.

The common-settings display flow begins with S290 at which the CPU 12 determines whether or not the MFP 10 is set such that the common settings are always displayed on the common-settings display area 90 during scrolling. When the MFP 10 is set such that the common settings are always displayed during the scrolling (S290: YES), the CPU 12 at S292 obtains the current common settings. The CPU 12 at S294 creates display of the obtained common settings in white. The CPU 12 at S296 displays the common settings in white on images being scrolled, and the common-settings display flow ends.

When the MFP 10 is not set such that the common settings are always displayed during the scrolling (S290: NO), the CPU 12 at S298 determines whether or not the MFP 10 is set such that the common settings are displayed during the scrolling of the images that had been displayed before. When the MFP 10 is set such that the common settings are displayed during the scrolling of the images that had been displayed before (S298: YES), the CPU 12 at S300 determines whether the current scrolling is the scrolling of the images that had been displayed before.

When the current scrolling is the scrolling of the images that had been displayed before (S300: YES), the CPU 12 executes the processings at S292 and subsequent steps, and the common-settings display flow ends. On the other hand, when the current scrolling is not the scrolling of the images that had been displayed before (S300: NO), the CPU 12 at S306 determines whether the common settings are being displayed on the common-settings display area 90 or not. When the common settings are not being displayed (S306: NO), the common-settings display flow ends. On the other hand, when the common settings are being displayed (S306: YES), the CPU 12 at S308 dismisses the common settings displayed on the common-settings display area 90, and the common-settings display flow ends.

When the MFP 10 is not set such that the common settings are displayed during the scrolling of the images that had been displayed before (S298: NO), the CPU 12 at S302 determines whether or not the MFP 10 is set such that the common settings are displayed during the scrolling of the images in the right direction.

When the MFP 10 is not set such that the common settings are displayed during the scrolling of the images in the right direction (S302: NO), the CPU 12 executes the processings at S306 and subsequent steps, and the common-settings display flow ends. On the other hand, when the MFP 10 is set such that the common settings are displayed during the scrolling of the images in the right direction (S302: YES), the CPU 12 at S304 determines whether the current scrolling is the scrolling of the images in the right direction or not. When the current scrolling is the scrolling of the images in the right direction (S304: YES), the CPU 12 executes the processings at S292 and subsequent steps, and the common-settings display flow ends. On the other hand, when the current scrolling is not the scrolling of the images in the right direction (S304: NO), the CPU 12 executes the processings at S306 and subsequent steps, and the common-settings display flow ends.

When the common-settings display flow ends, the CPU 12 returns to the drag processing flow and at S270 stores the input coordinates $(X_N, Y_N)$ as the preceding input coordinates $(X_0, Y_0)$, and the drag processing flow ends.

At S274 in the drag processing flow, the CPU 12 determines whether the button input state flag is "ON" or not. When the button input state flag is not "ON" (S274: NO), this flow goes to S282. On the other hand, when the button input state flag is "ON" (S274: YES), the CPU 12 at S276 determines whether the input coordinates $(X_N, Y_N)$ are located outside a display area of the any of the images or not.

When the input coordinates $(X_N, Y_N)$ are not located outside the display area of the any of the images (S276: NO), this flow goes to S282. On the other hand, when the input coordinates $(X_N, Y_N)$ are located outside the display area of the any of the images (S276: YES), the CPU 12 at S278 finishes the emphasized display of the touched or approached image. The CPU 12 at S280 sets the button input state flag to "OFF". The CPU 12 at S282 dismisses the common settings displayed on the common-settings display area 90. The CPU 12 at S284 executes an individual-settings display flow illustrated in FIG. 9.

Figure 9:
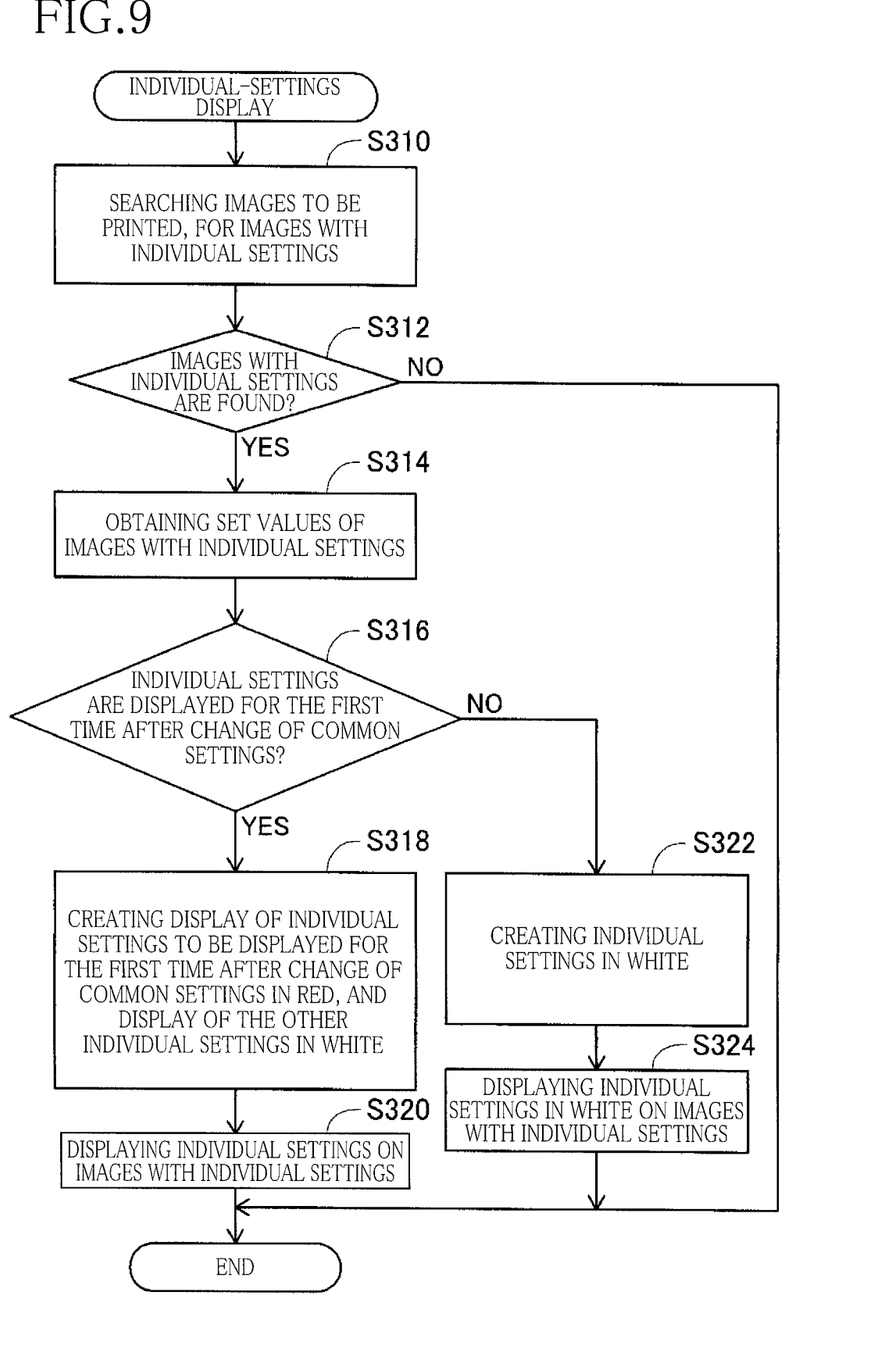
FIG. 9 is a flow chart illustrating processings executed in the MFP 10.

The individual-settings display flow begins with S310 at which the CPU 12 searches the images to be printed, for image(s) for which the individual settings are set. The CPU 12 at S312 determines whether the image(s) with the individual settings are found or not. When no images with the individual settings are found (S312: NO), the individual-settings display flow ends. On the other hand, when the image(s) with the individual settings are found (S312: YES), the CPU 12 at S314 obtains the set values (i.e., the individual settings) of the image(s) with the individual settings.

The CPU 12 at S316 determines whether or not the individual settings are displayed on the individual-setting display area 86 for the first time after the change of the common settings. When this display of the individual settings is the first display after the change of the common settings (S316: YES), this flow goes to S318 at which display of individual settings to be displayed for the first time after the change of the common settings is created in red, and display of the other individual settings is created in white. The CPU 12 at S320 displays the individual settings on the image(s) with the individual settings, and the individual-settings display flow ends.

When this display of the individual settings is not the first display after the change of the common settings (S316: NO), the CPU 12 at S322 creates the individual settings in white. The CPU 12 at S324 displays the individual settings in white on the image(s) with the individual settings, and the individual-settings display flow ends.

When the individual-settings display flow ends, the CPU 12 sets the common-settings input detection flag to "OFF" at S286 in the drag processing flow, and the drag processing flow ends. Upon completion of the processing at S286, the drag processing flow ends. The CPU 12 then returns to the main flow, and the main flow ends.

In the main flow, when the event type is not "DRAG" (S214: NO), the CPU 12 at S218 determines whether the event type is "RELEASE" or not. When the event type is not "RELEASE" (S218: NO), the main flow ends. On the other hand, when the event type is "RELEASE" (S218: YES), the CPU 12 at S220 executes a release processing flow illustrated in FIG. 10.

Figure 10:
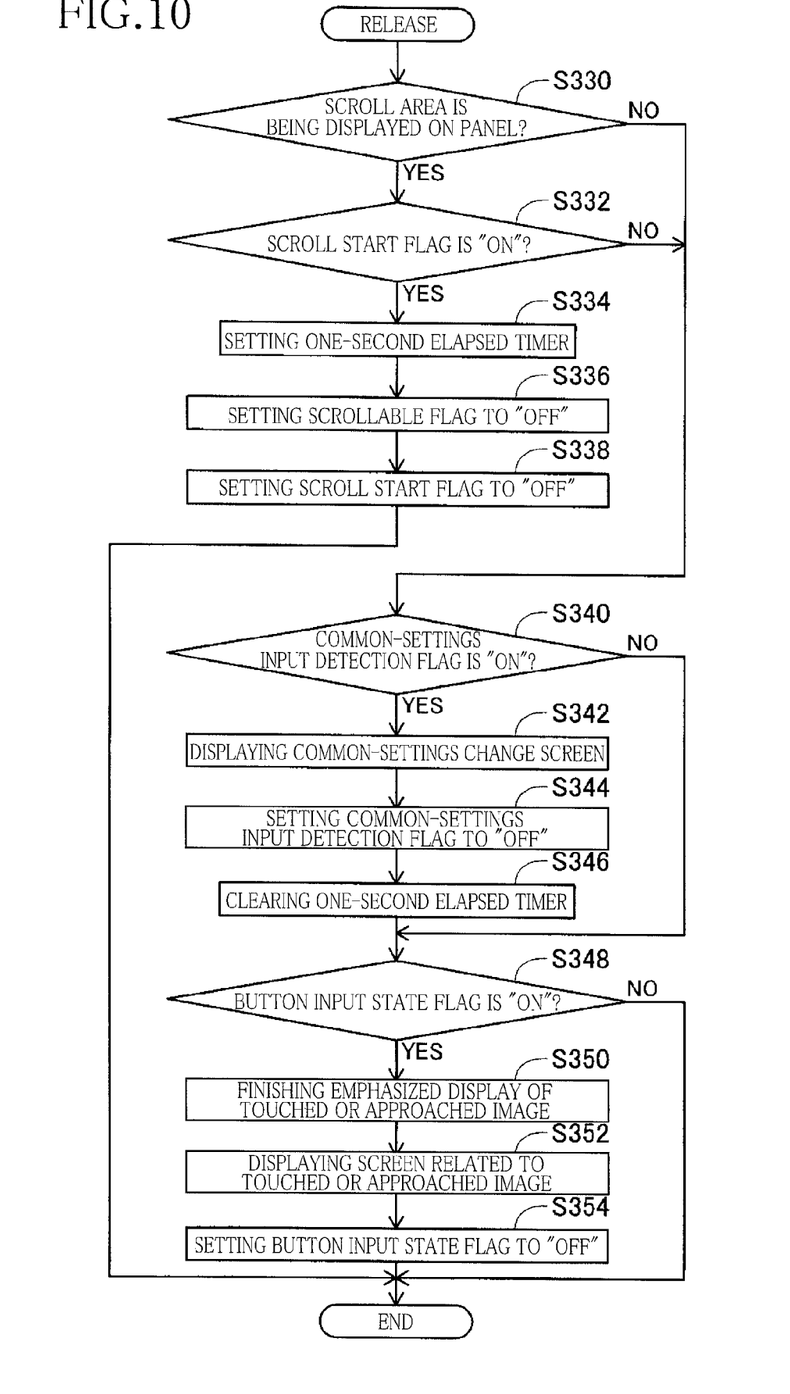
FIG. 10 is a flow chart illustrating processings executed in the MFP 10.

In the release processing flow, the CPU 12 at S330 determines whether the scroll area is being displayed on the panel 16 or not. When the scroll area is being displayed on the panel 16 (S330: YES), the CPU 12 at S332 whether the scroll start flag is "ON" or not. When the scroll start flag is "ON" (S332: YES), the CPU 12 at S334 sets a one-second elapsed timer. It is noted that when one second has passed from the set of the one-second elapsed timer, the event type is set to "one-second elapsed event". The CPU 12 at S336 sets the scrollable flag to "OFF" and at S338 sets the scroll start flag to "OFF", and the release processing flow ends.

When the scroll area is not being displayed on the panel 16 (S330: NO) or when the scroll start flag is not "ON" (S332: NO), the CPU 12 at S340 determines whether the common-settings input detection flag is "ON" or not. When the common-settings input detection flag is not "ON" (S340: NO), this flow goes to S348.

When the common-settings input detection flag is "ON" (S340: YES), the CPU 12 at S342 controls the panel 16 to display the common-settings change screen. The CPU 12 at S344 sets the common-settings input detection flag to "OFF". The CPU 12 at S346 clears the one-second elapsed timer and at S348 determines whether the button input state flag is "ON" or not.

When the button input state flag is not "ON" (S348: NO), the release processing flow ends. On the other hand, when the button input state flag is "ON" (S348: YES), the CPU 12 at S350 finishes the emphasized display of the touched or approached image. The CPU 12 at S352 controls the panel 16 to display the individual-settings change screen 70 related to the touched or approached image. The CPU 12 at S354 sets the button input state flag to "OFF", and the release processing flow ends.

Upon completion of the processing at S354, the release processing flow ends. The CPU 12 then returns to the main flow, and the main flow ends.

When the event type is "one-second elapsed event" at S206 in the main flow (S206: YES), the CPU 12 at S224 dismisses the common settings displayed on the common-settings display area 90. The CPU 12 at S226 executes the processings according to the individual-settings display flow and at S228 sets the common-settings input detection flag to "OFF", and the main flow ends.

<Functional Configuration of CPU>

In view of the above, the CPU 12 can be considered to have a functional configuration illustrated in FIG. 1. As illustrated in FIG. 1, the CPU 12 can be considered to include an image display controller 100, a scroll-period common-settings display controller 102, an individual-settings display controller 104, an operation-period common-settings display controller 106, a common-settings-screen display controller 108, and a storage device 110.

The image display controller 100 executes the processing at S200 according to the display program 50, that is, the image display controller 100 controls the panel 16 to display the images. The scroll-period common-settings display controller 102 executes the processing at S268 according to the display program 50, that is, the scroll-period common-settings display controller 102 controls the panel 16 to display the common settings during scrolling. The individual-settings display controller 104 executes the processing at S284 according to the display program 50, that is, the individual-settings display controller 104 controls the panel 16 to display the individual settings when the images are not moved. The operation-period common-settings display controller 106 executes the processing at S268 according to the display program 50, that is, the operation-period common-settings display controller 106 controls the panel 16 to display the common settings during the scroll operation even when the images are not scrolled. The common-settings-screen display controller 108 executes the processing at S342 according to the display program 50, that is, the common-settings-screen display controller 108 controls the panel 16 to display the screen for changing the common settings in response to the operation on the common-settings display area 90. The storage device 110 executes the processing at S300 according to the display program 50, that is, the storage device 110 stores the information for identifying the images 60 that had been displayed on the panel 16.

It is to be understood that the invention is not limited to the details of the illustrated embodiment, but may be embodied with various changes and modifications, which may occur to those skilled in the art, without departing from the spirit and scope of the invention. Specifically, for example, while the MFP 10 is employed as the image display apparatus for displaying the images and the setting items in the above-described embodiment, a device such as a printer, a personal computer or PC, and a mobile terminal may be employed as the image display apparatus.

While the individual-setting display area 86 and the common-settings display area 90 are located on the image(s) 60 in the above-described embodiment, the individual-setting display area 86 and the common-settings display area 90 may be located on a position not overlapping any images, for example, on a position on an upper, lower, right, or left side of the image 60, for example.

While when the individual settings are newly displayed after the change of the common settings, the individual settings are displayed in a different color in the above-described embodiment, the individual settings may be displayed in a different manner. Specifically, when the individual settings are newly displayed after the change of the common settings, the individual settings may blink or be displayed at different brightness, for example.

While the individual settings each different from the corresponding one of the common settings are displayed on the individual-setting display area 86 in the above-described embodiment, the individual settings individually set for all the setting items may be displayed. Also, for example, in a case where a set value for one setting item is set, not only the set value for the one setting item but also the other set values set for the image may be displayed on the individual-setting display area 86. In other words, all the set values including the set values not set individually for the setting items may be displayed. Also, while the set values different from the common settings are displayed only for the images to be printed in the above-described embodiment, the set values different from the common settings may be displayed for all the images displayed on the panel 16.

While the scroll operation is caused by the flick operation in the above-described embodiment, the scroll operation may be caused by various operations. Specifically, the scroll operation may be caused by an operation with a mouse and a key, for example. It is noted that the scroll direction is not limited to the right and left direction and may be various directions such as the up and down direction.

While the processings illustrated in FIGS. 4-10 are executed by the CPU 12 in the above-described embodiment, other devices may execute these processing. For example, these processing may be executed by an ASIC or other logical integrated circuits and may be executed by cooperation of the CPU 12, the ASIC, and other the logical integrated circuits, for example.

What is claimed is:

1. An image display apparatus, comprising:
   a storage configured to store a plurality of sets of image data;
   a display device configured to display a plurality of images based on the plurality of sets of image data stored in the storage, wherein at least one common setting is provided in common for the plurality of images, and an individual setting is allowed to be set individually for each of the plurality of images; and
   a controller configured to control the display device,
   the controller being configured to control the display device such that the at least one common setting is displayed on a common setting display area located on a fixed position in the display device while the plurality of images are being scrolled with respect to the display device, and
   the controller being configured to, while the plurality of images are not being scrolled with respect to the display device, control the display device to display at least one individual setting and at least one image of the plurality of images such that each of the at least one individual setting is displayed in association with a corresponding one of the at least one image.

2. The image display apparatus according to claim 1, wherein the controller is configured to control the display device not to display the at least one common setting after the scrolling of the plurality of images is stopped.

3. The image display apparatus according to claim 1, wherein the controller is configured to control the display device not to display the at least one common setting when a predetermined length of time has passed from the stop of the scrolling of the plurality of images.

4. The image display apparatus according to claim 1, wherein in a case where a plurality of individual settings are selectively set for the plurality of images, the controller controls the display device to display at least one image of the plurality of images and only at least one of the plurality of individual settings which differs from the at least one common setting, such that each of the at least one of the plurality of individual settings is displayed in association with a corresponding one of the at least one image.

5. The image display apparatus according to claim 1, wherein the controller is configured to, when the common setting display area on which the at least one common setting is being displayed on the display device is operated, control the display device to display a setting screen for setting the at least one common setting.

6. The image display apparatus according to claim 1, wherein the controller is configured to, when at least one of the at least one common setting is changed, control the display device to display at least one image of the plurality of images and at least one individual setting that differs from the changed at least one of the at least one common setting, such that each of the at least one individual setting is displayed in association with a corresponding one of the at least one image.

7. The image display apparatus according to claim 6, wherein the controller is configured to control the display device to display the at least one individual setting newly displayed when the at least one of the at least one common setting is changed, in a display manner that differs from a display manner of the at least one individual setting displayed before the at least one of the at least one common setting is changed.

8. The image display apparatus according to claim 1, further comprising a receiving unit configured to receive an input for scrolling the plurality of images displayed on the display device,
wherein the controller is configured to control the display device to display the at least one common setting when the receiving unit receives the input in a state where the plurality of images displayed on the display device are not being scrolled with respect to the display device.

9. The image display apparatus according to claim 1, wherein the controller is configured to control the display device to display the at least one individual setting and ones of the plurality of images such that each of the at least one individual setting is displayed in association with a corresponding one of only at least one image to be printed among the ones of the plurality of images.

10. The image display apparatus according to claim 9, wherein the controller is configured to control the display device to display the at least one image to be printed and at least one identifier such that each of the at least one identifier is displayed in association with a corresponding one of the at least one image to be printed, and each of the at least one identifier is displayed to identify the at least one image to be printed from at least one image not to be printed among the plurality of images.

11. The image display apparatus according to claim 1, wherein each of the at least one common setting and the individual setting is a print setting that is used for image printing based on at least one of the plurality of sets of image data.

12. The image display apparatus according to claim 11, wherein the common setting display area is located on a central portion of the display device.

13. A non-transitory storage medium configured to store computer-readable instructions executable by a computer of an image display apparatus, the image display apparatus comprising: a storage configured to store a plurality of sets of image data; and a display device configured to display a plurality of images based on the plurality of sets of image data stored in the storage, wherein at least one common setting is provided in common for the plurality of images, and an individual setting is allowed to be set individually for each of the plurality of images,
the computer-readable instructions comprising:
controlling the display device such that the at least one common setting is displayed on a common setting display area located on a fixed position in the display device while the plurality of images are being scrolled with respect to the display device; and
while the plurality of images are not being scrolled with respect to the display device, controlling the display device to display at least one individual setting and at least one image of the plurality of images such that each of the at least one individual setting is displayed in association with a corresponding one of the at least one image.

14. An image display apparatus, comprising:
a storage configured to store a plurality of sets of image data;
a display device configured to display a plurality of images based on the plurality of sets of image data stored in the storage, wherein at least one common setting is provided in common for the plurality of images, and an individual setting is allowed to be set individually for each of the plurality of images; and
a controller configured to control the display device,
the controller being configured to control the display device, when a preset condition is satisfied, such that the at least one common setting is displayed on a common setting display area located on a fixed position in the display device while the plurality of images are being scrolled with respect to the display device, and
the controller being configured to, while the plurality of images are not being scrolled with respect to the display device, control the display device to display at least one individual setting and at least one image of the plurality of images such that each of the at least one individual setting is displayed in association with a corresponding one of the at least one image.

15. The image display apparatus according to claim 14, wherein the preset condition is a predefined direction of scrolling, and wherein the controller is configured to control the display device to display the at least one common setting while the plurality of images are being scrolled in the predefined direction, and
wherein the controller is configured to control the display device not to display the at least one common setting while the plurality of images are being scrolled in a direction opposite the predefined direction.

16. The image display apparatus according to claim 14, further comprising an information storage configured to store information for identifying at least one image that had been displayed before on the display device, and wherein the preset condition is whether all images being moved onto the display device have been previously displayed or not,
wherein the controller is configured to control the display device to display the at least one common setting when all images being scrolled are the at least one image identified based on the information stored in the information storage, and
wherein the controller is configured to control the display device not to display the at least one common setting when at least one of the plurality of images being scrolled is an image that differs from the at least one image identified based on the information is being scrolled.

* * * * *